UNITED STATES PATENT OFFICE 2,448,661

METHOD OF PREPARING PARASITICIDES CONTAINING ALUMINUM HYDROXIDE

Homer L. Cupples, Alexandria, Va.; dedicated to the free use of the People in the territory of the United States No Drawing. Application September 28, 1944, Serial No. 556,242

1 Claim. (Cl. 167—33)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the People in the territory of the United States to take effect on the granting of a patent to me.

This invention relates to parasiticides (insecticides and fungicides) and, in particular, to aqueous, substantially homogeneous compositions, such as dispersions or solutions of toxic agents, which may be applied to vegetation or other solid surfaces in such manner that upon evaporation of the water and the other volatile constituents, a solid film remains containing the active toxic agent, together with such other non-volatile materials as are present in the parasiticide.

The principal object of this invention is to obtain a parasiticide in which the solid film, which contains the toxic agent, adheres well to the vegetation or other solid surface under adverse conditions, such as rainfall, wind, mechanical abrasion, and so forth.

In general, according to this invention, a mixture, containing a desired concentration of a toxic agent either dispersed or dissolved in an aqueous medium, such as water or solution, is prepared, the pH of the mixture being such as to precipitate compounds of aluminum, a soluble aluminum compound, and a soluble base, if a base is necessary to adjust the pH. Preferably, a volatile base is used for this purpose. Other accessory adherents, such as gum arabic, may also be included.

The following example is illustrative of the invention:

There is dispersed 10.8 g. of xanthone in a mixture containing 50 ml. of 1% gum arabic solution and 60 ml. of 10% [Al₂(SO₄)₃.18H₂O] solution. This mixture is added to 2835 ml. of tapwater, and to this is added, with stirring, 55 ml. of dilute NH₄OH solution (one volume of NH₄OH of specific gravity 0.90, diluted to ten volumes). The resulting parasiticide may be applied as a spray and permitted to dry. It is recommended that it be used immediately or soon after preparation.

Parasiticides prepared according to this invention, upon evaporation of the volatile components, produce solid films which have superior adherence qualities, as illustrated by the following data on tests:

*Comparison of resistance of xanthone spray deposits on apples to a standard water washing test*

|  | Micrograms per Sq. Cm. before Water Washing | Micrograms per Sq. Cm. after Water Washing |
|---|---|---|
| Xanthone Dispersed in Water | 22.6 | 3.7 |
| Xanthone Dispersed as in the example | 26.4 | 19.7 |

It is to be understood that other toxic agents may be substituted for the xanthone. For example, substitution of phenothiazine gave similar results. Also, other water soluble compounds of aluminum may replace the hydrated aluminum sulphate, and other water soluble bases, such as morpholine, may replace the ammonium hydroxide. Preferably, however, the base should be volatile so that if an excess is present, it will evaporate from the deposited film.

In the event that a strong non-volatile base, such as calcium hydroxide, is used, it should be used in an amount not greater than that which will chemically combine with the aluminum salt so as to precipitate aluminum compounds. Furthermore, if the compound is to be used in a spray for vegetation, care should be taken in controlling the amount of base used, since too high a pH in the final solution is destructive of the vegetation.

Although the incorporation of a small amount of gum arabic as an accessory adherent is preferred, other vegetable gums may be used or they may be omitted, without seriously impairing the efficacy of the parasiticide.

It is to be understood also that the concentrations of the various ingredients in the mixture may be varied over a wide range so long as the pH is properly adjusted to precipitate the aluminum compounds.

Having thus described my invention, I claim:

A process of preparing parasiticides comprising the mixing of xanthone, a vegetable gum, aluminum sulphate, water, and ammonium hydroxide, the latter three ingredients being in the proportion of about 60 milliliters of 10% aluminum sulphate, to about 2835 milliliters of water, to about 55 milliliters of ammonium hydroxide (specific gravity 0.90 diluted from one to ten volumes), thereby precipitating aluminum hydroxide in situ.

HOMER L. CUPPLES.

REFERENCES CITED

The following references are of record in the file of this patent:

UNITED STATES PATENTS

| Number | Name | Date |
|---|---|---|
| 2,194,218 | Dickeson | Mar. 19, 1940 |
| 2,236,545 | Maxwell et al. | Apr. 1, 1941 |
| 2,247,339 | Robinson | June 24, 1941 |
| 2,264,762 | Knight | Dec. 2, 1941 |
| 2,414,660 | Nikitin | Jan. 21, 1947 |

OTHER REFERENCES

Journal of Economic Entomology, 1935, 28, 728 by Lipp et al.